US007092910B2

(12) United States Patent
Iwamura

(10) Patent No.: US 7,092,910 B2
(45) Date of Patent: Aug. 15, 2006

(54) METHOD, APPARATUS, AND SYSTEM FOR PROCESSING INFORMATION BY ATTACHING INFORMATION TO DIGITAL DATA, AND STORAGE MEDIUM STORING COMPUTER-READABLE PROGRAM CODES TO CARRY OUT THE METHOD

(75) Inventor: Keiichi Iwamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 678 days.

(21) Appl. No.: 10/293,258

(22) Filed: Nov. 14, 2002

(65) Prior Publication Data

US 2003/0101141 A1 May 29, 2003

(30) Foreign Application Priority Data

Nov. 28, 2001 (JP) ............................. 2001-363298
Sep. 24, 2002 (JP) ............................. 2002-277547

(51) Int. Cl.
*H04L 9/00* (2006.01)
(52) U.S. Cl. ........................................ 705/55; 713/176
(58) Field of Classification Search ............ 705/51–59; 713/167, 176; 717/117; 706/45–48; 707/104.1, 707/205; 725/5, 54; 700/103; 382/190, 382/198
See application file for complete search history.

(56) References Cited

U.S. PATENT DOCUMENTS

| 5,600,720 | A | | 2/1997 | Iwamura et al. |
| 5,629,980 | A | * | 5/1997 | Stefik et al. ................... 705/54 |
| 5,666,419 | A | | 9/1997 | Yamamoto et al. |
| 5,933,498 | A | * | 8/1999 | Schneck et al. ............... 705/54 |
| 5,937,395 | A | | 8/1999 | Iwamura |
| 6,088,454 | A | | 7/2000 | Nagashima et al. |
| 6,272,634 | B1 | * | 8/2001 | Tewfik et al. ................ 713/176 |
| 6,425,081 | B1 | | 7/2002 | Iwamura |
| 6,456,726 | B1 | * | 9/2002 | Yu et al. ...................... 382/100 |
| 6,937,553 | B1 | * | 8/2005 | Mitui et al. .................... 369/84 |
| 2001/0012019 | A1 | | 8/2001 | Yamazaki et al. |
| 2001/0017709 | A1 | | 8/2001 | Murakami et al. |
| 2001/0017717 | A1 | | 8/2001 | Ishida et al. |
| 2001/0055390 | A1 | | 12/2001 | Hayashi et al. |
| 2002/0002679 | A1 | | 1/2002 | Murakami et al. |
| 2002/0060736 | A1 | | 5/2002 | Wakao et al. |
| 2002/0104003 | A1 | | 8/2002 | Iwamura |
| 2002/0133705 | A1 | | 9/2002 | Tagashira et al. |
| 2002/0146146 | A1 | * | 10/2002 | Miolla et al. ................ 382/100 |
| 2003/0138126 | A1 | * | 7/2003 | Hashimoto ................... 382/100 |

FOREIGN PATENT DOCUMENTS

JP 2000-287067 10/2000
JP 2003143533 A * 5/2003

OTHER PUBLICATIONS

Atre, "Rules for Data Cleaning", Computerworld, v32n10, pp. 69-72, Mar. 9, 1998, ISSN: 0010-4841.*

* cited by examiner

*Primary Examiner*—Mary D. Cheung
(74) *Attorney, Agent, or Firm*—Fitzpatrick, Cella, Harper & Scinto

(57) ABSTRACT

A system and method are provided for selecting, from among a plurality of attachment schemes, an attachment scheme which is appropriate for embedding information in digital data, attaching information representing the selected attachment scheme to the digital data using a predetermined attachment scheme, and attaching arbitrary information such as copyright information or user information to the digital data using the selected attachment scheme.

10 Claims, 2 Drawing Sheets

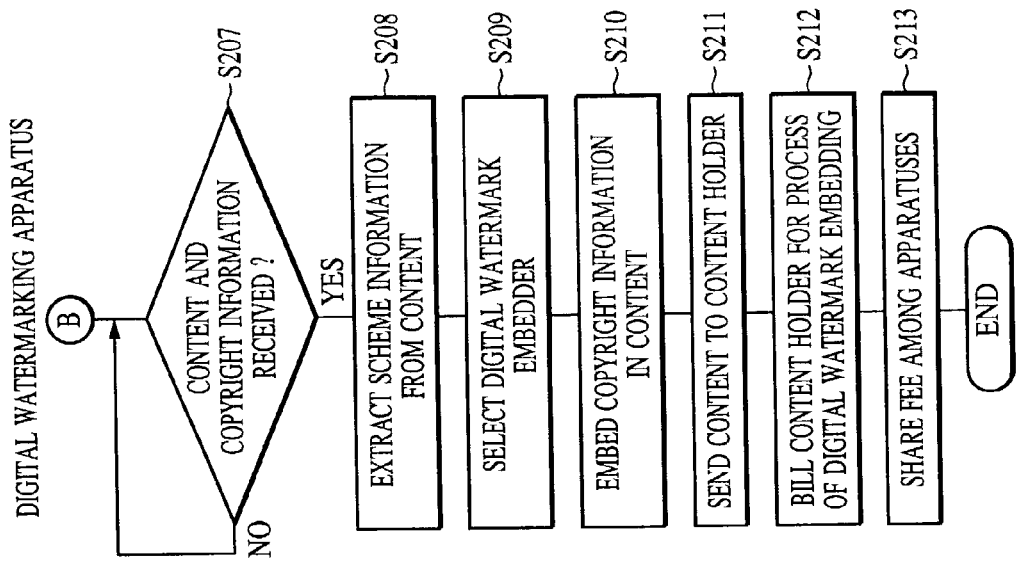
FIG. 2C DIGITAL WATERMARKING APPARATUS
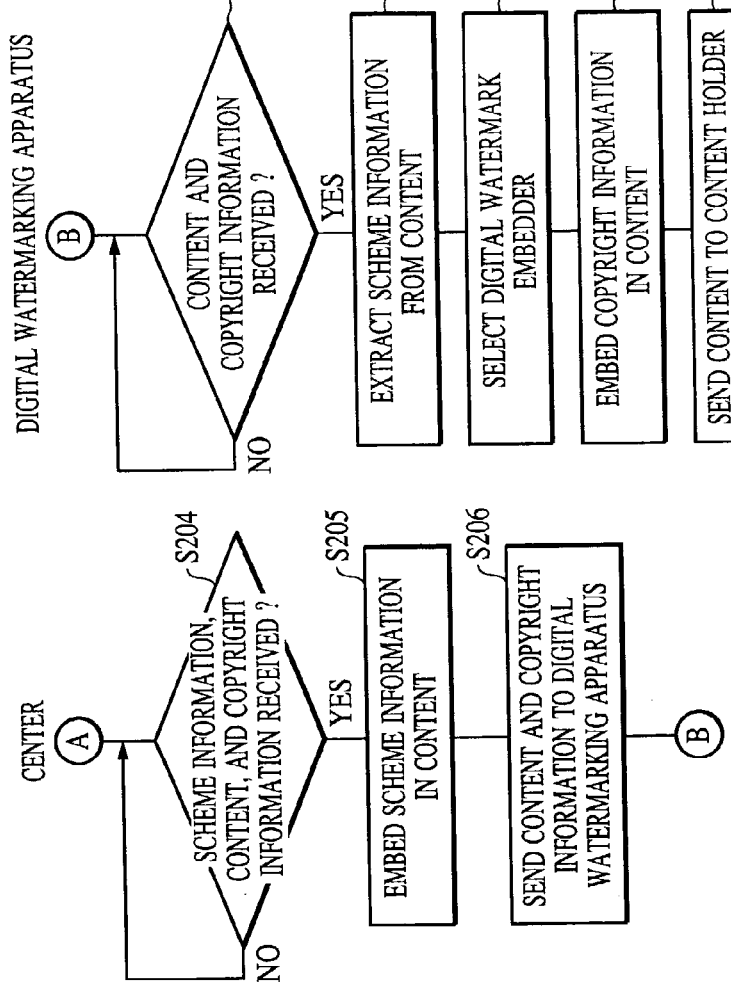
FIG. 2B CENTER
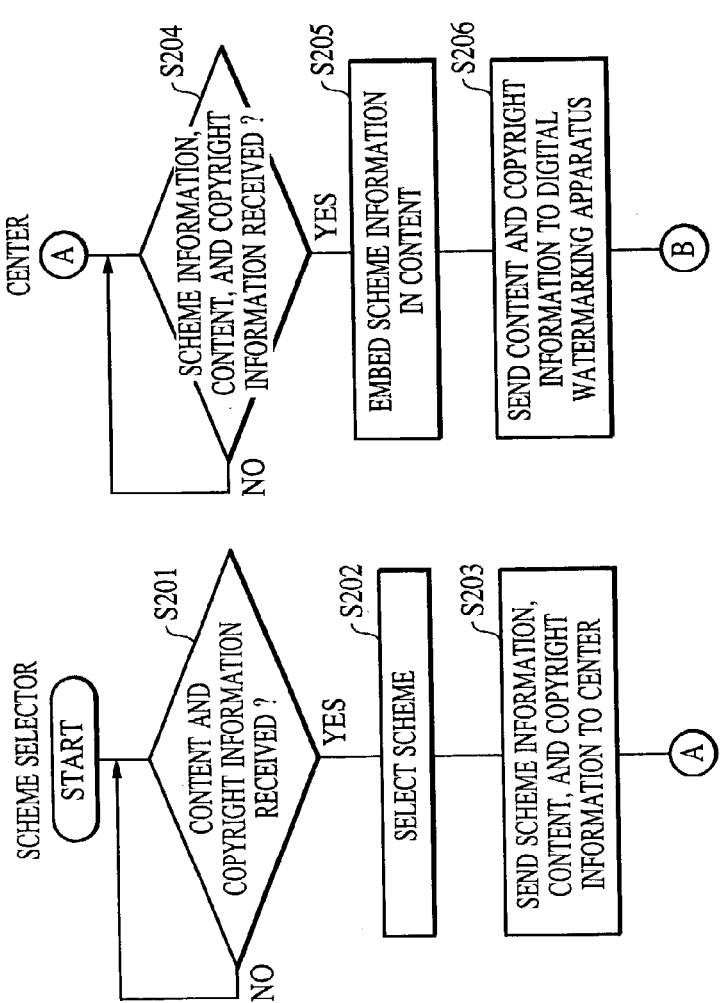
FIG. 2A SCHEME SELECTOR

METHOD, APPARATUS, AND SYSTEM FOR PROCESSING INFORMATION BY ATTACHING INFORMATION TO DIGITAL DATA, AND STORAGE MEDIUM STORING COMPUTER-READABLE PROGRAM CODES TO CARRY OUT THE METHOD

BACKGROUND OF THE INVENTION

1. Field of the Invention

The present invention relates to a method, an apparatus, and a system for processing information by attaching information to digital data (such as data representing a document, an image, or music) to protect a copyright of the digital data, to protect the digital data from being counterfeited, and to manage the digital data, and also relates to a storage medium storing a computer-readable program to carry out the method.

2. Description of the Related Art

Due to rapid advances in computers and computer networks, a diversity of digital data, such as document data, image data, and audio data, is handled by computers and computer networks. Since such digital data is easily copied, copyright of the digital data is frequently violated. Copyright information and user information are occasionally embedded using a digital watermark technique, without drawing attention to them, in a manner such that those items of information are not recognized either in vision or by hearing. In this way, a user of the digital data can extract the copyright information from the digital data, and can examine the copyright information to determine whether the digital data has been distributed by an unauthorized third party. A copyright holder of the digital data can extract the user information from the digital data, and can examine the user information to determine whether the digital data has been illegally obtained by the user.

A first requirement of the digital watermark technique is that the digital watermark embedded in the digital data go unnoticed by the senses of human beings. In other words, a digital watermark must be embedded without degrading the quality of the original digital data (quality).

A second requirement of the digital watermark is that the embedded digital watermark remain embedded. Even if the digital data is edited, for example, compressed or filter processed, the embedded digital watermark must not be lost (robustness).

A third requirement of the digital watermark is that the amount of information of the digital watermark to be embedded into the digital data be selected depending on the application of the digital data (the amount of information).

The three requirements imposed on the digital watermark are mutually traded-off with respect to each other.

For example, a scheme of digital watermarking that embeds information with a sufficient robustness suffers from a relatively large quality degradation, and the amount of information embedded becomes small.

Schemes of digital watermarking that embed the digital watermark in multi-level digital data representing still image are divided into two major types. In one type, a digital watermark is embedded in a spatial area, and in the other type, a digital watermark is embedded in a frequency domain.

The scheme of embedding the digital watermark into a spatial area of the digital data is not so much degraded in quality, but is less robust. The scheme of embedding the digital watermark in the frequency domain of the digital data suffers from a significant quality degradation, but is more robust. Among the various schemes of embedding the digital watermark in a spatial area of the digital data and the schemes of embedding the digital watermark in the frequency domain of the digital data, some are robust but the amount of information embeddable is small, and others suffer less from quality degradation but are less robust.

It is difficult for a copyright holder of digital data to select an appropriate embedding scheme for a digital watermark in the digital data from among numerous schemes.

The scheme used in embedding the digital watermark is related to a scheme of extracting the digital watermark in one-to-one correspondence, and is generally incompatible with another scheme.

If an individual is not aware of the type of scheme through which information is attached to the digital data, the information cannot be extracted from the digital data.

SUMMARY OF THE INVENTION

In a first aspect of the present invention, a system for processing information includes a first terminal including a selector for selecting an attachment scheme for attaching first information to digital data based on one of an attribute of the digital data and an attribute of the first information to be attached to the digital data, a second terminal including a first attachment unit for attaching second information to the digital data, the second information indicating the attachment scheme selected by the selector and being attached using a predetermined attachment scheme, an extractor for extracting scheme information indicated by the second information from the digital data using an extraction scheme corresponding to the predetermined attachment scheme, and a third terminal including a second attachment unit for attaching the first information to the digital data using the attachment scheme indicated by the second information extracted by the extractor.

In a second aspect of the present invention, a method for processing information includes the steps of selecting an attachment scheme for attaching first information to digital data based on one of an attribute of the digital data and an attribute of the first information to be attached to the digital data, attaching second information to the digital data, the second information indicating the attachment scheme selected in the selecting step and being attached using a predetermined attachment scheme, extracting scheme information indicated by the second information from the digital data using an extraction scheme corresponding to the predetermined attachment scheme, and attaching the first information to the digital data using the attachment scheme indicated by the second information extracted in said extracting step.

In a third aspect of the present invention, an apparatus for processing information includes a selector for selecting an attachment scheme for attaching first information to digital data based on one of an attribute of the digital data and an attribute of the first information to be attached to the digital data, and a transmitter for transmitting second information, indicating the attachment scheme selected by the selector, to an attachment unit for attaching the second information to the digital data using a predetermined attachment scheme.

In a fourth aspect of the present invention, an apparatus for processing information includes a receiver for receiving digital data to which first information is attached using a predetermined attachment scheme, an extractor for extracting the first information from the received digital data using an extraction scheme corresponding to the predetermined attachment scheme, and a transmitter for transmitting the digital data to an attachment unit which attaches second information to the digital data using an attachment scheme indicated by the first information extracted by the extractor.

In a fifth aspect of the present invention, a method for processing information includes the steps of selecting an attachment scheme for attaching first information to digital data based on one of an attribute of the digital data and an attribute of the first information to be attached to the digital data, and transmitting second information indicating the selected attachment scheme to an attachment unit which attaches the second information to the digital data using a predetermined attachment scheme.

In a sixth aspect of the present invention, a method for processing information includes the steps of receiving digital data to which first information is attached using a predetermined attachment scheme, extracting the first information from the received digital data using an extraction scheme corresponding to the predetermined attachment scheme, and transmitting the digital data to an attachment unit which attaches second information to the digital data using an attachment scheme indicated by the first information extracted in said extracting step.

According to a seventh aspect of the present invention, a system for processing information includes a selector that selects an attachment scheme for attaching first information to digital data; a first attachment unit that attaches second information, which indicates the selected attachment scheme, to the digital data using a predetermined attachment scheme; an extractor that extracts the attachment scheme information indicated by the second information from the digital data, using an extraction scheme corresponding to the predetermined attachment scheme; and a second attachment unit that attaches the first information to the digital data using the attachment scheme indicated by the second information extracted by the extractor.

In an eighth aspect of the present invention, a storage medium stores program codes for a software program for performing one of the above methods.

Other features and advantages of the present invention will be apparent from the following description taken in conjunction with the accompanying drawings, in which like reference characters designate the same or similar parts through the figures thereof.

BRIEF DESCRIPTION OF THE DRAWINGS

The accompanying drawings, which are incorporated in and constitute a part of the specification, illustrate preferred embodiments of the invention and, together with the description, serve to explain the principles of the invention.

FIGS. 2A, 2B, and 2C are flow diagrams illustrating the operation of the information processing system of the one embodiment of the present invention.

DESCRIPTION OF THE PREFERRED EMBODIMENTS

Figure 1:
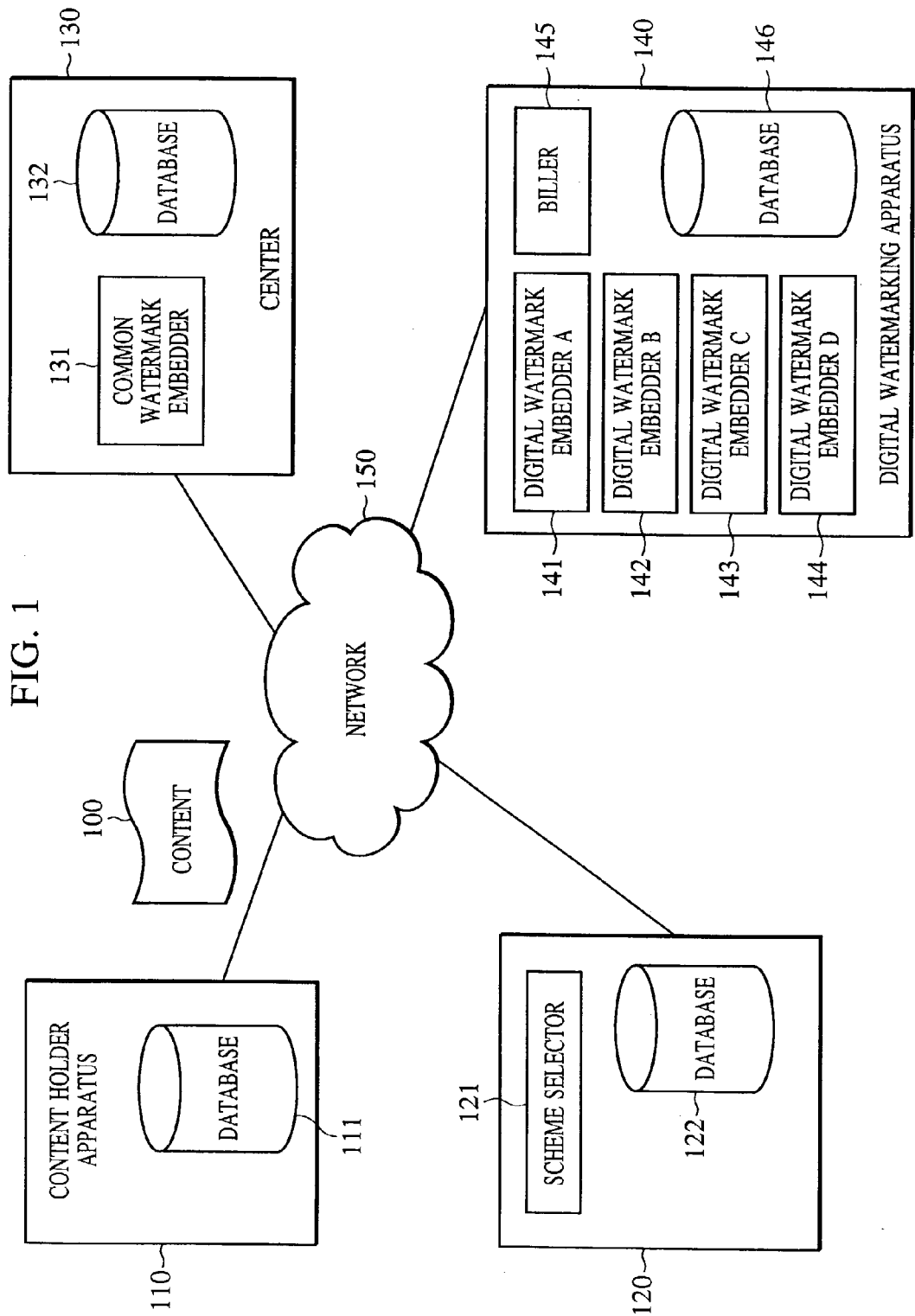
FIG. 1 is a block diagram diagrammatically illustrating an information processing system in accordance with one embodiment of the present invention.

The embodiments of the present invention will now be discussed with reference to the accompanying drawings.

<Construction of Information Processing System>

FIG. 1 illustrates an information processing system of a first embodiment of the present invention.

A network 150 is a global network such as the Internet or a public telephone line.

A content 100 is delivered by content holder apparatus 110 and distributed over the network 150. The content 100 is digital data such as document data, image data, or music data.

The content holder apparatus 110 delivers the content 100 over the network 150. The content holder apparatus 110 communicates through the network 150, and includes an image processing apparatus (not shown) for processing the information of the content 100. The image processing apparatus may, for example, be a personal computer or a mobile telephone. The content holder apparatus 110 includes a database 111 which stores a variety of information such as the content 100, copyright information of a content holder, and user information of a user who is permitted to use the content 100.

A scheme selector apparatus 120 selects a scheme of embedding a digital watermark into the content 100. The scheme selector apparatus 120 includes a scheme selector 121 and a database 122. The database 122 stores a table that associates attribute information of a content with a scheme appropriate for the content, a table that associates an application of a digital watermark with a scheme appropriate therefor, and a table that associates the scheme with a charge for an embedding process using the scheme. The scheme selector 121 references a variety of information stored in the database 122, and selects a scheme appropriate for embedding the digital watermark in the content 100. The scheme selector apparatus 120 transmits scheme information indicating the selected scheme to a center 130 through communication means (not shown).

The center 130 embeds the scheme information into the content 100 using a predetermined embedding scheme disclosed beforehand. The center 130 includes a common watermark embedder 131 which embeds the scheme information into the content 100 using the predetermined embedding scheme. The center 130 also includes a database 132 which stores a table which associates the scheme indicated by the scheme information with a digital watermarking apparatus 140 which embeds a digital watermark in the content 100 using the scheme. Referencing the table stored in the database 132, the center 130 transmits the content 100 to the digital watermarking apparatus 140 through communication means (not shown).

The digital watermarking apparatus 140 embeds the digital watermark in the content 100 using the indicated scheme. The digital watermarking apparatus 140 includes digital watermark embedders A–D (141–144 respectively) for embedding the digital watermark in the content 100 using different schemes. A database 146 stores a table that associates the digital watermark embedders 141–144 with the fees required for the respective embedding processes thereof, and the commissions of the scheme selector apparatus 120 and the center 130. A biller 145 calculates the fees for the process of embedding the digital watermark by referencing the database 146, and bills the content holder apparatus 110 for the fees. The digital watermarking apparatus 140 transmits the content 100 to the content holder apparatus 110 through communication means (not shown).

The digital watermark embedders 141–144, different in their respective features, each perform one of a digital watermark embedding scheme that places priority on the robustness of information, a digital watermark embedding scheme that places priority on the quality of information, a digital watermark embedding scheme that places priority on the amount of information, or a digital watermark embedding scheme that places priority on the balance of robustness, quality, and the amount of information.

Furthermore, the digital watermark embedders 141–144 may be from different suppliers, for example, they respectively may perform a digital watermark embedding scheme supplied by a company A, a digital watermark embedding scheme supplied a company B, a digital watermark embedding scheme supplied by a company C, or a digital watermark embedding scheme supplied by a company D.

The digital watermark embedders 141–144 may also be different in the type of appropriate content, for example, they respectively may perform a digital watermark embedding scheme that is appropriate for still image data, a digital watermark embedding scheme that is appropriate for moving image data, a digital watermark embedding scheme that is appropriate for music data, or a digital watermark embedding scheme that is appropriate for document data.

The digital watermark embedders 141–144 also may be different in application, for example, they respectively may perform a digital watermark embedding scheme that is appropriate for protecting the copyright, or a digital watermark embedding scheme that is appropriate for detecting a counterfeited portion.

The present invention is not limited to the digital watermark embedding schemes mentioned.

In this embodiment, four digital watermark embedders are discussed for simplicity. The number of digital watermark embedders is not limited to four.

Each of the scheme selector apparatus 120, the center 130, and the digital watermarking apparatus 140 includes a plurality of server apparatuses and database devices to carry out the above-referenced functions. The server apparatuses and database devices are mutually interconnected through a Local Area Network (LAN).

<Procedure for Embedding the Digital Watermark into the Content>

The procedure for embedding the digital watermark into the content 100 in accordance with the present embodiment will now be discussed with reference to FIG. 2.

The scheme selector apparatus 120 receives the content 100 and information to be embedded into the content 100 from the content holder apparatus 110 via the network 150 (step S201).

In this embodiment, the information to be embedded into the digital data is copyright information of a content holder. Instead of the copyright information, the information to be embedded may be other information such as ID information for uniquely identifying a content, or user information of a user who is permitted to use the content.

The scheme selector 121 in the scheme selector apparatus 120 selects an appropriate scheme for embedding the digital watermark into the content 100 received in step S201 (step S202). The scheme selector 121 analyzes and evaluates the content 100, references a variety of information stored in the database 122, and then selects a scheme considering the attributes of the content 100, such as the type, the complexity, and the shape of the content 100.

The scheme may be selected depending on the application of the information embedded in the content 100. In this embodiment, a scheme appropriate for protecting the copyright of the content 100 using the copyright information is selected.

A scheme may be selected in accordance with the amount of information to be embedded.

Alternatively, a scheme may be selected in accordance with the fee required to embed the information. In this case, a less expensive scheme may be automatically selected, or a desired fee range may be received from the content holder apparatus 110 and a scheme may be selected according to the fee range.

The scheme selector apparatus 120 transmits, to the center 130, the scheme information indicating the scheme selected in step S202, and the content 100 and the copyright information received in step S201 (step S203).

The center 130 receives the scheme information, the content 100, and the copyright information transmitted by the scheme selector apparatus 120 in step S203 (step S204).

The center 130 embeds the scheme information received in step S204 into the content 100 through a predetermined embedding scheme (step S205).

The center 130 transmits the content 100 with the scheme information embedded therein in step S205 and the copyright information to the digital watermarking apparatus 140 (step S206).

When there are a plurality of digital watermarking apparatuses 140, the center 130 determines the appropriate digital watermarking apparatus 140 based on the scheme information. If there are a plurality of digital watermarking apparatuses 140 which use the same scheme indicated by the scheme information, the center 130 may determine the appropriate digital watermarking apparatus 140 referring to other conditions such as a charged fee.

The digital watermarking apparatus 140 receives the content 100 and the copyright information transmitted by the center 130 in step S206 (step S207).

The digital watermarking apparatus 140 extracts the scheme information embedded in the content 100 received in step S207 using a scheme corresponding to the predetermined embedding scheme (step S208). Optionally, before transmission, the scheme information may be attached to the content rather than being embedded in the content.

The digital watermarking apparatus 140 selects one of the digital watermark embedders 141–144 in accordance with the scheme information extracted in step S208 (step S209).

It is now assumed in this embodiment that the digital watermark embedder 141 is selected. The following procedure remains unchanged if one of the digital watermark embedders 142–144 is selected.

The digital watermarking apparatus 140 embeds the copyright information into the content 100 using the digital watermark embedder 141 selected in step S209 (step S210).

The digital watermarking apparatus 140 transmits the content 100 with the scheme information and the copyright information embedded therein to the content holder apparatus 110 (step S211).

The digital watermarking apparatus 140 reports the fee for the embedding process to the content holder apparatus 110, thereby performing a billing process (step S212).

For example in the billing process, the digital watermarking apparatus 140 communicates with an apparatus (not shown) of a financial institution such as a credit card company or a bank in accordance with a credit number reported by the content holder apparatus 110 for endorsement.

The digital watermarking apparatus 140 may report, to the content holder apparatus 110, the fee for the scheme through which the copyright information is embedded into the content 100 plus the commission of the scheme selector apparatus 120 and the center 130.

If the digital watermarking apparatus 140 bills a total amount of fees for a plurality of embedding processes at a time, the digital watermarking apparatus 140 may simply report each fee to the content holder apparatus 110 in step S212. When a predetermined number of embedding processes is reached, when a predetermined period of time elapses, or when it becomes a predetermined date, the digital watermarking apparatus 140 may bill the total amount.

The process in step S212 may be carried out prior to step S211.

The digital watermarking apparatus 140 shares the fee, billed to the content holder apparatus 110 in step S211, with the scheme selector apparatus 120 and the center 130 as necessary (step S213).

The content holder apparatus 110 delivers the content 100 with the scheme information and the copyright information embedded therein for distribution over the network 150.

When the copyright information is embedded in the content 100 as described above, the center 130 extracts the scheme information using a scheme corresponding to the predetermined embedding scheme when the user transmits the content 100 to the center 130. The center 130 transmits the content 100 to the digital watermarking apparatus 140 based on the scheme information, causing the identified digital watermarking apparatus 140 to extract the copyright information from the content 100 and notifies the user of the copyright information. In this way, based on the reported copyright information, the user determines whether or not the content 100 is distributed in an unauthorized manner.

When the content holder apparatus 110 transmits the content 100 with the user information embedded therewithin to the center 130, the center 130 extracts the scheme information using a scheme corresponding to the predetermined embedding scheme. The center 130 transmits the content 100 to the digital watermarking apparatus 140 in accordance with the scheme information, causing the digital watermarking apparatus 140 to extract the user information, and notifying the content holder apparatus 110 of the user information. In this way, the content holder determines whether or not the user has illegally obtained the content 100 based on the reported user information.

The center 130 may contain the scheme selector apparatus 120. The center 130 may further contain the digital watermarking apparatus 140. The content holder apparatus 110 may contain the scheme selector apparatus 120. Such an embodiment may be constructed by accommodating one apparatus in another apparatus, by dividing one apparatus into a plurality of units or by combining a plurality of apparatuses into one unit.

When the content holder apparatus 110 transmits the content 100 and the copyright information to the scheme selector apparatus 120 in accordance with the present embodiment, the scheme selector apparatus 120 transmits the content 100, the copyright information, and the scheme information to the center 130, and the center 130 transmits the content 100 with the scheme information embedded therein and the copyright information to the digital watermarking apparatus 140. The present invention is not limited to this arrangement. For example, when the content holder apparatus 110 transmits the content 100 and the copyright information to the scheme selector apparatus 120, the scheme selector apparatus 120 returns the content 100, the copyright information and the scheme information to the content holder apparatus 110. Or, when the content holder apparatus 110 transmits the content 100, the copyright information and the scheme information to the center 130, the center 130 returns the content 100 with the scheme information embedded therein and the copyright information to the content holder apparatus 110. The content holder apparatus 110 may transmit the content 100 and the copyright information to the digital watermarking apparatus 140.

In accordance with the present embodiment, the digital watermarking apparatus 140 bills the content holder apparatus 110 for the fee for the embedding process and shares the payment with the scheme selector apparatus 120 and the center 130. The present invention is not limited to this arrangement. The center 130 may bill the content holder apparatus 110 for the fee for the embedding process by the digital watermarking apparatus 140 plus the commission of the scheme selector apparatus 120 and the center 130, sharing the payment with the scheme selector apparatus 120 and the digital watermarking apparatus 140. In this case, the center 130 stores a table that associates the embedding scheme of the digital watermarking apparatus 140 with the fee corresponding thereto, or a table that associates the digital watermarking apparatus 140 with the embedding scheme, and the fee corresponding thereto. Referencing the table, the center 130 determines the fee for the embedding process of the digital watermarking apparatus 140. Alternatively, the center 130 may determine the total amount by summing the commission and the fee reported by the digital watermarking apparatus 140.

In this embodiment, the digital watermarking apparatus 140 bills the content holder apparatus 110 for the fee for the embedding process of the digital watermarking apparatus 140 and the commission to be paid to the scheme selector apparatus 120 and the center 130. The present invention is not limited to this arrangement. The scheme selector apparatus 120 and the center 130 may respectively bill the content holder apparatus 110 for the commissions thereof. In this case, each of these apparatuses may transfer the content 100 to another apparatus after billing, and may request that apparatus to perform a next process.

In the present embodiment, one content holder apparatus 110, one scheme selector apparatus 120, one center 130, and one digital watermarking apparatus 140 are used. The present invention is not limited to the number of apparatuses described above.

When there are a plurality of scheme selector apparatuses 120, the content holder apparatus 110 stores, in the database 111, a table that holds information of the plurality of scheme selector apparatuses 120. The content holder apparatus 110 transmits the content 100 and the copyright information to the scheme selector apparatus 120 which is selected by referencing the table. The table storing the information of the scheme selector apparatuses 120 may be stored in a database (not shown) accessed over the network 150. In this case, each content holder apparatus 110 is freed from the responsibility of managing the table.

The present invention is not limited to the system or a combination of apparatuses discussed above. Program codes of a software program for performing the function of the preferred embodiment may be supplied in a computer (a CPU or an MPU) in the system or the apparatus, and the computer in the system or the apparatus drives devices in accordance with the program codes. Such an arrangement that performs the function of the preferred embodiment falls within the scope of the present invention.

The program codes of the software program perform the function of the preferred embodiment. The program codes, and means for supplying the computer with the program codes, specifically, a storage medium storing the program codes, fall within the scope of the present invention.

Available as storage media for supplying the program codes are semiconductor memories such as a ROM (Read-Only Memory) or RAM (Random-Access Memory), a floppy disk, a hard disk, an optical disk, a magneto-optical disk, a CD-ROM (Compact Disk-ROM), a magnetic tape, a nonvolatile memory card, and the like.

The function of the preferred embodiment may be performed by the computer which controls a variety of devices in accordance with the supplied program codes. Furthermore, the function of the preferred embodiment may be performed when the program codes work in cooperation with an OS (operating system) or another application software program running on the computer. The program codes also fall within the scope of the present invention.

The program codes are stored in a memory in a feature expansion board or a feature expansion unit connected to the computer. A CPU mounted on the feature expansion board or the feature expansion unit performs partly or entirely the actual process in response to the instruction from the program codes. The function of the preferred embodiment is thus performed through the process. Such an arrangement falls within the scope of the present invention.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for attaching first information to digital data, said system comprising:
    a first terminal comprising:
        first receiver means for receiving the first information and the digital data;
        selector means for selecting a first attachment scheme from a plurality of attachment schemes based on one of an attribute of the digital data or an attribute of the first information; and
        first transmitter means for transmitting the digital data, the first information, and second information indicating the selected first attachment scheme;
    a second terminal comprising:
        second receiver means for receiving the digital data, the first information, and the second information;
        first attachment means for attaching the second information to the digital data using a second attachment scheme that is predetermined; and
        second transmitter means for transmitting the first information and the digital data to which the second information is attached; and
    a third terminal comprising:
        third receiver means for receiving the first information and the digital data to which the second information is attached;
        extractor means for extracting the second information from the digital data using an extraction scheme corresponding to the predetermined second attachment scheme; and
        second attachment means for attaching the first information to the digital data using the first attachment scheme indicated by the second information extracted by said extractor means.

2. A system according to claim 1, wherein the attribute of the digital data is at least one of a type, a complexity, and a shape of the digital data.

3. A system according to claim 1, wherein the attribute of the first information is at least one of the amount of information of the first information and an application of the first information.

4. A system according to claim 1, wherein the first information is one of items of information relating to a user who is permitted to use the digital data, and information about a copyright holder of the digital data.

5. A system according to claim 1 further comprising billing means for billing the charge for the attachment scheme selected by said selector means.

6. A system according to claim 1, wherein there are a plurality of terminals having the same configuration as said third terminal, each of which corresponds to an attachment scheme selectable by said selector means.

7. A system according to claim 1, wherein there are a plurality of attachment means having the same configuration as said second attachment means, each of which corresponds to an attachment scheme selectable by said selector means.

8. A method for attaching first information to digital data, said method comprising the steps of:
    receiving the first information and the digital data at a first terminal;
    selecting a first attachment scheme from a plurality of attachment schemes based on one of an attribute of the digital data or an attribute of the first information;
    transmitting the digital data, the first information, and second information indicating the selected first attachment scheme;
    receiving the digital data, the first information, and the second information at a second terminal;
    attaching the second information, which indicates the selected first attachment scheme, to the digital data using a second attachment scheme that is predetermined;
    transmitting the first information and the digital data to which the second information is attached;
    receiving the first information and the digital data to which the second information is attached at a third terminal;
    extracting the second information from the digital data using an extraction scheme corresponding to the predetermined second attachment scheme; and
    attaching the first information to the digital data using the first attachment scheme indicated by the second information extracted in said extracting step.

9. A storage medium containing computer-readable program codes for performing a method of attaching first information to digital data, said method comprising the steps of:
    receiving the first information and the digital data at a first terminal;
    selecting a first attachment scheme from a plurality of attachment schemes based on one of an attribute of the digital data or an attribute of the first information;
    transmitting the digital data, the first information, and second information indicating the first attachment scheme;
    receiving the digital data, the first information, and the second information at a second terminal;
    attaching the second information to the digital data, using a second attachment scheme that is predetermined;
    transmitting the first information and the digital data to which the second information is attached;
    receiving the first information and the digital data to which the second information is attached at a third terminal;

extracting the second information from the digital data using an extraction scheme corresponding to the predetermined second attachment scheme; and attaching the first information to the digital data using the first attachment scheme indicated by the second information extracted in said extracting step.

10. A system for attaching first information to digital data, said system, comprising:
- a first terminal comprising:
  - a first receiver that receives the first information and the digital data;
  - a selector that selects a first attachment scheme from a plurality of attachment schemes based on one of an attribute of the digital data and an attribute of the first information; and
  - a first transmitter that transmits the digital data, the first information and second information indicating the selected first attachment scheme;
- a second terminal comprising:
  - a second receiver that receives the digital data, the first information, and the second information;
  - a first attachment unit that attaches the second information to the digital data using a second attachment scheme that is predetermined; and
  - a second transmitter that transmits the first information and the digital data to which the second information is attached; and
- a third terminal comprising:
  - a third receiver that receives the first information and the digital data to which the second information is attached;
  - an extractor that extracts the second information from the digital data, using an extraction scheme corresponding to the predetermined second attachment scheme; and
  - a second attachment unit that attaches the first information to the digital data using the first attachment scheme indicated by the second information extracted by said extractor.

* * * * *

UNITED STATES PATENT AND TRADEMARK OFFICE
CERTIFICATE OF CORRECTION

| | |
|---|---|
| PATENT NO. | : 7,092,910 B2 |
| APPLICATION NO. | : 10/293258 |
| DATED | : August 15, 2006 |
| INVENTOR(S) | : Keiichi Iwamura |

It is certified that error appears in the above-identified patent and that said Letters Patent is hereby corrected as shown below:

ON THE TITLE PAGE, AT ITEM (56), RC:
Foreign Patent Documents, "2003143533 A" should read --2003-143533 A--.

COLUMN 5:
Line 7, "supplied" should read --supplied by--.

Signed and Sealed this

Twenty-second Day of May, 2007

JON W. DUDAS
*Director of the United States Patent and Trademark Office*